United States Patent [19]

Farmer et al.

[11] Patent Number: 5,142,575
[45] Date of Patent: Aug. 25, 1992

[54] METHOD AND APPARATUS FOR IMPROVING VIDEO SCRAMBLING AND EMPLOYING SPLIT SYNC PULSES

[75] Inventors: James O. Farmer, Lilburn; Blair J. Schodowski, Alpharetta; Joseph G. Mobley, Dunwoody; Gregory C. Cole, Marietta; John E. Tumblin, Decatur; Robert O. Banker, Cumming; Lamar West, Maysville, all of Ga.

[73] Assignee: Scientific-Atlanta, Inc., Norcross, Ga.

[21] Appl. No.: 430,414

[22] Filed: Nov. 2, 1989

Related U.S. Application Data

[62] Division of Ser. No. 188,480, Apr. 29, 1988, Pat. No. 4,924,498.

[51] Int. Cl.⁵ .......................................... H04N 7/167
[52] U.S. Cl. ....................................... 380/15; 380/10
[58] Field of Search ............................ 380/10, 15, 20; 358/148

[56] References Cited

U.S. PATENT DOCUMENTS

| | | | |
|---|---|---|---|
| 2,691,061 | 10/1954 | Crotty et al. | 380/15 |
| 2,705,740 | 4/1955 | Druz | 380/15 |
| 3,081,376 | 3/1963 | Loughlin et al. | 380/7 |
| 3,184,537 | 5/1965 | Court et al. | 380/15 |
| 3,439,113 | 4/1969 | Walker | 380/15 |
| 3,460,161 | 8/1969 | Waller et al. | 380/15 |
| 3,824,332 | 7/1974 | Horowitz | 380/15 |
| 4,095,258 | 6/1978 | Sperber | 380/15 |
| 4,222,068 | 9/1980 | Thompson | 380/15 |
| 4,336,553 | 6/1982 | den Toonder et al. | 380/7 |
| 4,390,899 | 6/1983 | Osaka et al. | 380/15 |
| 4,396,946 | 8/1983 | Bond | 380/15 |
| 4,396,947 | 8/1983 | Cheung | 380/15 |
| 4,400,732 | 8/1983 | Watanabe et al. | 358/147 |
| 4,454,544 | 6/1984 | Abbott | 380/15 |
| 4,458,268 | 7/1984 | Ciciora | 380/15 |
| 4,467,353 | 8/1984 | Citta et al. | 380/12 |
| 4,471,380 | 9/1984 | Mobley | 380/15 |
| 4,511,919 | 4/1985 | Forgey et al. | 380/15 |
| 4,551,767 | 11/1985 | Higashiguchi et al. | 358/413 |
| 4,562,465 | 12/1985 | Glaab | 380/15 |
| 4,568,974 | 2/1986 | den Toonder et al. | 380/15 |
| 4,575,755 | 3/1986 | Schoeneberger et al. | 380/15 |
| 4,598,318 | 7/1986 | Robbins | 380/17 |
| 4,628,358 | 12/1986 | Robbins | 380/17 |
| 4,631,603 | 12/1986 | Ryan | 360/37.1 |
| 4,679,078 | 7/1987 | Wong et al. | 380/15 |
| 4,682,360 | 7/1987 | Frederiksen | 380/10 |
| 4,695,901 | 9/1987 | Ryan | 380/5 |
| 4,716,588 | 12/1987 | Thompson et al. | 380/20 |
| 4,864,400 | 9/1989 | Kumada et al. | 358/148 |

OTHER PUBLICATIONS

*Reference Data for Radio Engineers*, Fourth Edition; (International Telephone and Telegraph, New York; 1959); pp. 794–795.

*Primary Examiner*—Bernarr E. Gregory
*Attorney, Agent, or Firm*—William A. Marvin

[57] ABSTRACT

This invention discloses a new and improved method of scrambling video signals by inversion of the video information by splitting the sync pulse into plural portions and transmitting each portion of the sync pulse at a predetermined level. This improves the quality of the recovered video compared with other video inversion systems by rendering the video less sensitive to variations in the modulation depth of the modulator carrying the inverted signal, the demodulation sensitivity of the demodulator and the stability of the recovery circuits. The invention further provides additional security against pirating by allowing the scrambling circuit to operate in diverse modes, each of which will cause a TV to react differently should a conventional pirating device be employed. The invention also renders the signal capable of being transmitted with unmodified modulators of the type normally employed in the CATV industry.

30 Claims, 13 Drawing Sheets

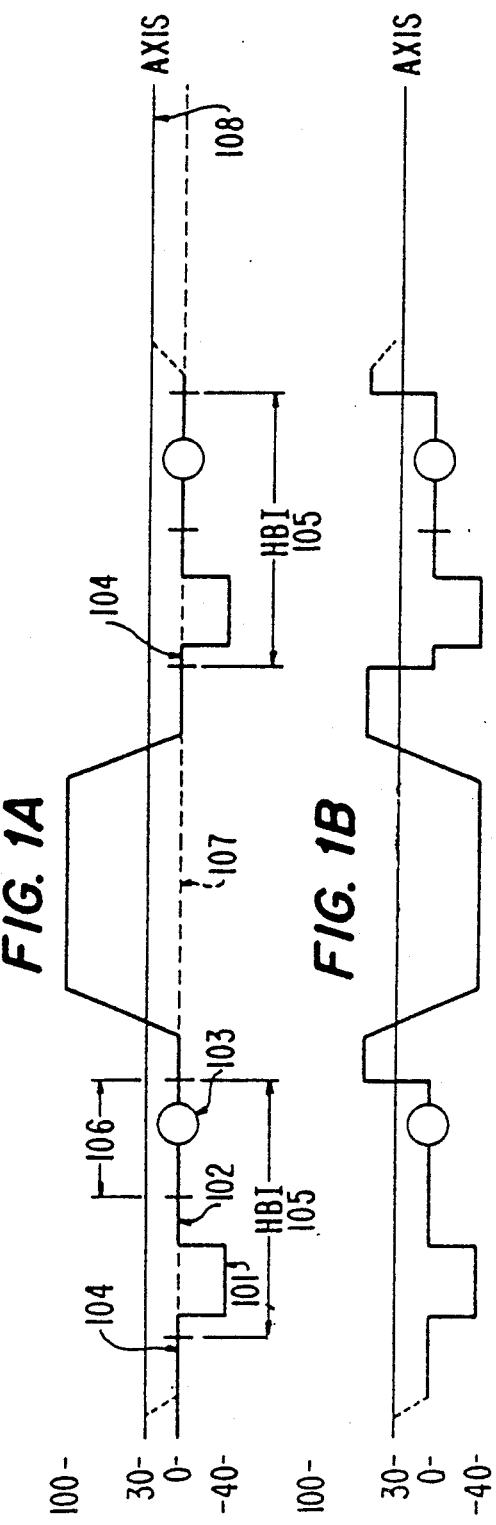

FIG. 3
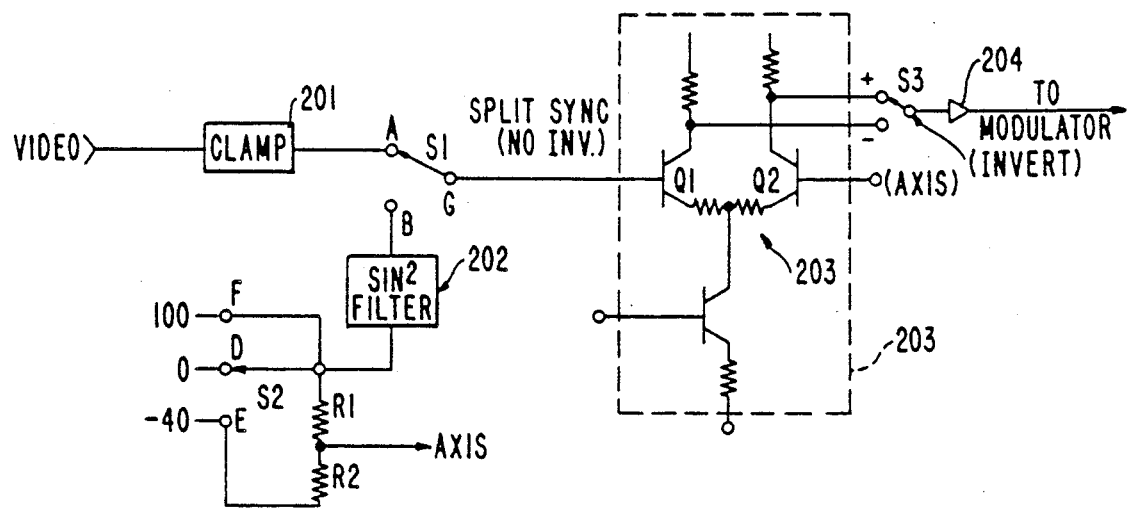
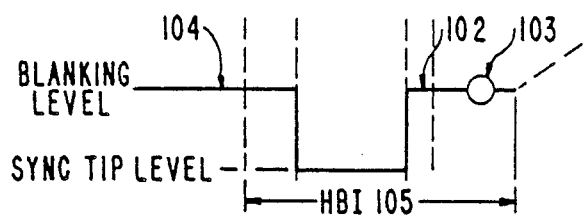
FIG. 4A
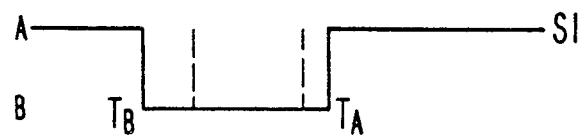
FIG. 4B
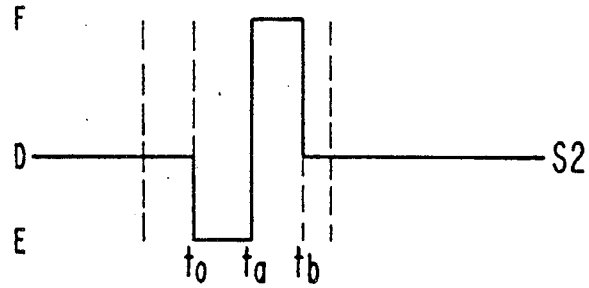
FIG. 4C

DESCRAMBLER

SCRAMBLER

MODULATOR

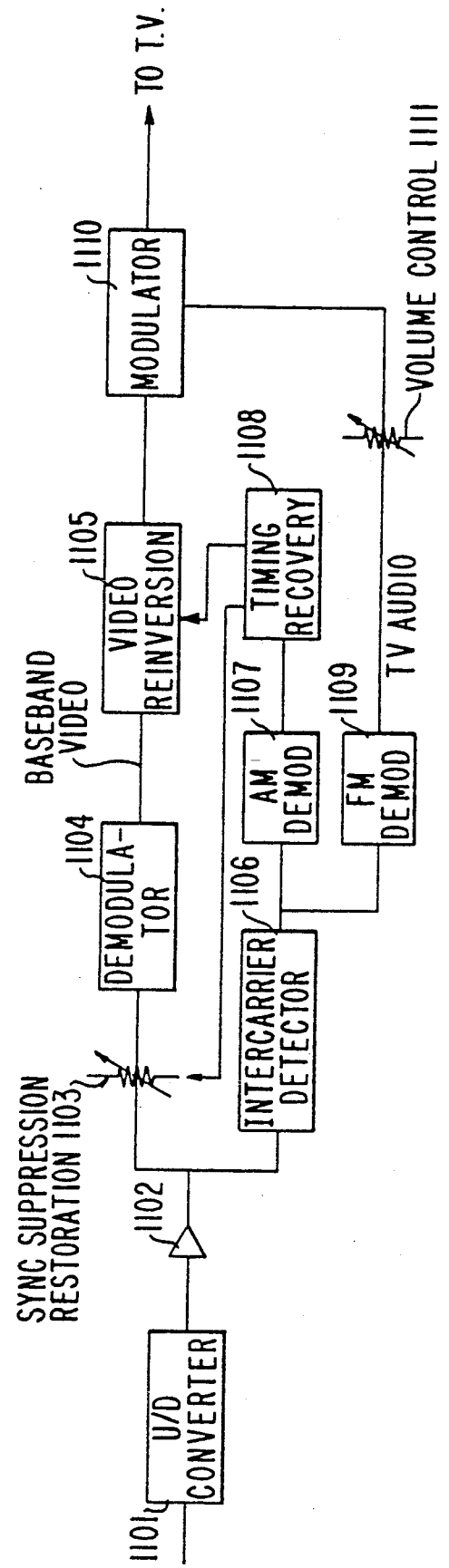

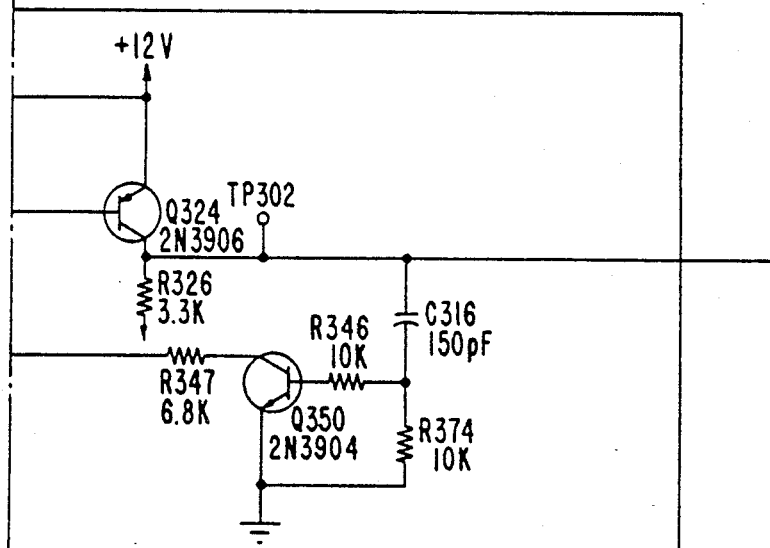
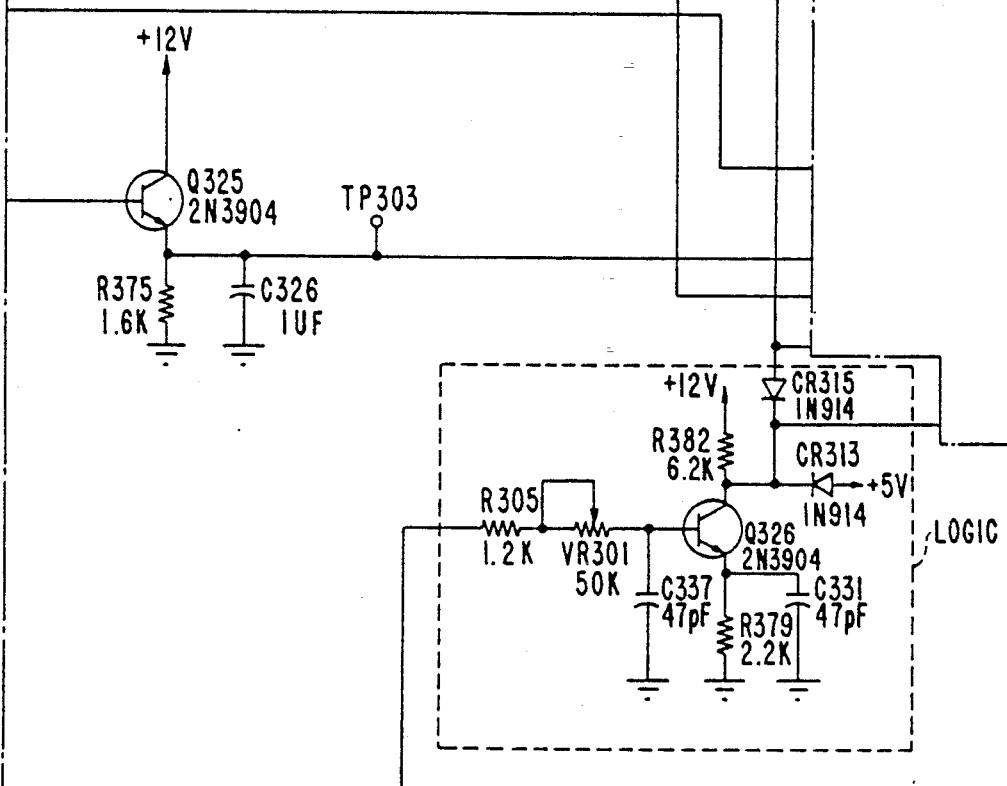
FIG. 12B

METHOD AND APPARATUS FOR IMPROVING VIDEO SCRAMBLING AND EMPLOYING SPLIT SYNC PULSES

This application is a division of application Ser. No. 188,480, filed Apr. 29, 1988, now U.S. Pat. No. 4,924,498.

BACKGROUND OF THE INVENTION

The need for scrambling video signals is well known in the art. Various methods of scrambling signals are known. One method of scrambling involves inverting a signal or a portion of a signal at the transmitter side and reinverting the signal or portion at the receiver side to reconstruct the proper video signal.

At the transmitter side, the portion of the video signal that is inverted is inverted about a selected axis. Typically, this axis may be a function of system parameters. For example if +100 IRE represents the peak white level of a video signal and −40 IRE represents the sync tip level or the most negative portion of the signal, then a likely choice for the axis of inversion would be +30 IRE. This point is half way between the most negative and most positive portions of the signal. Therefore if the most negative portion of the signal is inverted about this axis it should not exceed the most positive portion (+100 IRE). Similarly, if the white peak level is inverted about this axis, it will not fall below the most negative portion (−40 IRE).

For a better understanding of video signals and some inversion schemes, attention is now drawn to FIGS. 1A-1D. FIG. 1A illustrates a sketch of a video signal. This figure and the labeled parts thereof is intended to serve as a model to assist the reader in being able to identify some key portions of the video signals of this and other figures described in the specification. For clarity these portions are not generally labeled in the other figures. Those skilled in the art will recognize the generality of the figures.

With reference to FIG. 1A, it can be seen that each line of video signals is characterized by a horizontal sync pulse, 101, represented by the sync tip pulse or the most negative state of the video signal. This pulse normally last 4.7 microseconds and is repeated 15,734 times each second in the NTSC television system used in the U.S. and many other countries. Following the sync pulse, the signal voltage returns to the blanking level or block level, which is used as a reference level. By common convention, the amplitude of the blanking level is considered to be 0 IRE, a unit of measure adopted by the Institute of Radio Engineers (now IEEE). The sync tip is at a level of −40 IRE, while peak white is at a level of +100 IRE. This maximum normal excursion of the TV signal of 140 IRE is conventionally equated to 1 volt peak to peak, though other voltage levels are sometimes employed internal to a particular piece of equipment. Following the return to a blanking level after a sync tip portion, and after a delay known as the breezeway, 102, the color burst 103, occurs. The color burst is composed of eight cycles (nominally) of the color subcarrier, 3.58 MHz in NTSC transmission. The amplitude and, more importantly, the phase of the color burst are essential to proper recovery of the color information, as is well understood by those skilled in the art. After a delay following the color burst, the active video interval, indicated generally as 107, begins. The time from the end of the sync pulse to the beginning of active video is called the back porch, 106. The end of the active video defines the front porch, 104, shown twice to emphasize that the signal repeats. The entire interval from the beginning of the front porch to the end of the back porch is collectively known as the horizontal blanking interval (HBI), 105.

The active video interval, 107, actually consists of various voltages representing the brightness (luminance) of the image, plus a color subcarrier (not shown), which carries color saturation ("purity") information as amplitude modulation, and color value ("tint") represented by its phase with respect to burst 103. This pattern of sync and active video is repeated for 252.5 lines (including vertical blanking). This number of lines constitutes one "field" and is followed by an interleaved second field. The two fields together make up a "frame," or one complete picture. Typically, the frame rate is 30/sec, that is, frames are produced 30 times each second.

FIGS. 1B-1D illustrates some of the various ways in which a video signal may be inverted. In FIG. 1B the active video line is inverted but the horizontal blanking interval (HBI) is not. This is known by those skilled in the art as inverted video with non-inverted sync. FIG. 1C illustrates an inverted HBI with normal active video. FIG. 1D illustrates a combination of the two, that is, inverted video and inverted HBI.

In the case of active video inversion only, FIG. 1B, the sync occurs normally, however the synchronization recovery circuits in the TV receiver have a hard time recovering the sync. This is because the sync circuits are designed to look for the most negative portion of the video signal. As shown, in the case of inverted video, the peak white signal has now been moved to the amplitude of the sync, so the sync circuits will not be able to distinguish sync from peak white. In the event the sync circuits do successfully identify the sync information (for example, in a dark scene having no peak white), the picture will appear as the negative of the real picture, because the light and dark levels have been reversed. Further, the color information will be rendered incorrect because the phase of the color subcarrier is reversed in the inversion process.

FIG. 1C illustrates inverted sync with noninverted video. In this case the picture information would appear correct if sync recovery was possible, but since the sync has been inverted, the sync circuits will not be able to identify the sync, rendering the picture garbled.

FIG. 1D combines the above inversion methods by inverting both the sync and the video.

A desirable method of video scrambling would be to allow changing from one of these modes to another either randomly or based upon some predetermined condition such as average picture level (APL). These modes have been used singly or in combination in scrambling systems employed during the last few years. Other modes of scrambling are known and may also be used with the present invention. These other known modes have not been show, for the sake of clarity. Some other known modes of scrambling include sync suppression, dynamic sync suppression, drop field and various combinations of the above.

Past systems have suffered from at least two problems which create artifacts in the recovered signal. If sync is inverted, the automatic gain control (AGC) circuits of the demodulator, employed to recover the signal before descrambling, will not be able to recover a good gain reference for automatic gain control (AGC). This is so because the inverted sync pulse is normally transmitted as the highest amplitude of the modulated signal, which the AGC circuits look for in order to normalize the amplitude of the received signal. But when the sync pulse is inverted, the peak value of the modulated signal corresponds to the peak white level in the scene. Since the peak white level is a function of the picture, it does not form a satisfactory reference. One possible solution to this problem would be to detect the minimum value of the carrier and use it as a reference as is done in the SECAM television system employed in France and other countries. However, since the same demodulator circuit is called upon to handle both scrambled and nonscrambled signals (inverted and noninverted), it would therefore be necessary to provide two AGC detectors for recovering scrambled and unscrambled signals, one for detecting inverted and one for detecting non-inverted signals. This would significantly add to cost of the circuit. Moreover, the difficulty of matching the performance of two different AGC detectors is formidable.

A second important deficiency of past systems arises due to the "calculation" of the axis of inversion, shown generally as 108 in FIG. 1A. This axis is the voltage level (measured in IRE units) about which a portion of the signal to be inverted is rotated. One can image that the signal is "anchored" to the axis of rotation and flips about it so that its negative peak becomes its positive peak and vice versa. In order to effect proper descrambling, the axis of inversion in the scrambler and the descrambler must be identical since if the signal or a portion thereof is inverted about an axis in the scrambler, it must be reinverted about the same axis in the descrambler to accurately reproduce the correct picture signal information. Should the descrambler have a different axis of inversion than the scrambler, the recovered signal will be shifted with respect to the transmitted signal. This results in either stretched or compressed video signals and/or sync pulses. In either case the brightness levels of the recovered video will be altered, leaving an undesirable artifact in the picture. This artifact is especially troublesome if the method of video inversion is changed frequently (a desirable condition for immunity to pirating).

Past systems have relied on factory calibration to maintain the integrity of the axis of inversion in a system. This scheme is unsatisfactory. For example, some systems may measure the level of the sync signal, and "count off" the distance to the axis of inversion. As known to those of skill in the art, a particularly convenient axis of inversion is +30 IRE, half way between the sync tip (−40 IRE) and peak white (+100 IRE). If the normal amplitude of the recovered signal at the descrambler is 1 volt, then the voltage difference between the sync and the axis is (70/140)×(1 volt)=0.5 volt But suppose that the depth of modulation at the modulator is changed such that the recovered signal is not 1 volt, but is 0.9 volts instead. The descrambler has no knowledge of this change, so it will assume the axis to be 0.5 volt from the sync tip. However, the axis is really (70/140)×(0.9 volt)=0.45 volt from the sync tip. The descrambler places the axis in error by 0.05 volt, which can be shown equivalent to an error of 7.78 IRE. When the axis of inversion is in error, it can be shown that the error in the resultant video is twice the error in the axis, or 15.56 IRE.

One of ordinary skill in the art will further appreciate that other conditions (e.g., drift) in the transmitter or receiver can cause errors in the calculation of the axis of inversion.

A further deficiency of past systems is manifested in the headend of the CATV system, where the signal is scrambled. The modulator, which must impress the scrambled signal on a RF carrier, includes a sync tip clamping circuit used to normalize the peak envelope of the modulated signal to a desired level. Reference to FIG. 1C or D shows that in these scrambling modes, the sync does not occur at the expected peak negative of the video signal, rendering the clamp useless. Past systems have required that a modified modulator be used to retain the clamp function. This modification typically was rather extensive and rendered the modulator on which it was performed, void of the manufacturer's warrantee.

OBJECTS ON THE INVENTION

In view of the deficiencies of the prior art, this invention teaches a new and improved method for use with video signals scrambled by inversion of portions of the video signal information.

It is an object of this invention to improve the quality of the recovered video signals compared with prior art video inversion systems. This includes rendering the video less sensitive to variations in the amplitude of the incoming signal, the modulation depth of the modulator carrying the inverted signal, the demodulation sensitivity of the demodulator and the stability of the recovery circuits.

A further object of this invention is to render additional security against pirating by allowing the scrambling circuit to operate in diverse modes, each of which will cause a TV to react differently should a conventional pirating device be employed.

Yet another object of the invention is to provide an improved method and apparatus of recovering scrambled video signals without having to replace or modify the modulators presently employed in the CATV industry. Past systems have sometimes relied on significant modification of the modulator, which imposed an additional burden on a cable operator wishing to employ a new technique.

It is another object of this invention to provide more information during the sync pulse to enable the axis of inversion to be accurately calculated.

Accordingly, it an object of this invention to overcome the above mentioned deficiencies in an economical fashion.

SUMMARY OF THE INVENTION

FIGS. 2A, 2B and 2C illustrate waveforms which illustrate one aspect of the present invention. According to a novel aspect of the present invention, the sync pulse is split into plural portions. A portion of the sync pulse may be transmitted at one level, e.g., a conventional sync level of −40 IRE. Another portion of the sync pulse may be transmitted at another level, e.g., at +100 IRE, which corresponds to the peak white level.

As can be seen in FIG. 2A, a first portion of the sync pulse may be transmitted at a first level, here the sync tip level, for a time period $t_1$ (where $t_1$<sync pulse duration) and a second portion of the sync pulse is transmitted at a level corresponding to peak white for a time $t_2$ (where $t_2 <$ sync pulse duration). The values of $t_1$ and $t_2$ may preferably be equal to each other, however $t_1$ may be greater than $t_2$ or $t_2$ may be greater than $t_1$. If the sync pulse is transmitted in two portions as shown in FIGS. 2A or 2B, the time $t_1 + t_2$ should equal the sync pulse duration time. The sync pulse duration time is typically on the order of 4.7 $\mu$sec but it may vary as will be apparent to those skilled in the art.

In FIG. 2B, $t_1$ represents the duration of the first portion of the sync pulse which corresponds to a peak white level (+100 IRE) and $t_2$ represents the duration of a second portion of the sync pulse which corresponds to the sync tip level (−40 IRE). In this configuration, the first portion of the sync pulse is transmitted at a higher level than a subsequent portion of the sync pulse. For example, the first portion of the snyc pulse is transmitted at the peak white level and a second portion of the sync pulse is transmitted at a sync tip level. This provides the additional advantage that even if the sync tip level is detected, it will be delayed in time thereby causing a picture shift.

A further embodiment is characterized by providing a sync pulse split into three portions. In this embodiment, the three portions of the sync pulse may each be transmitted at a level different from the level of the other two or some may be equal to each other. By way of example, a preferred form of this embodiment is shown in FIG. 2C. in FIG. 2C, the first portion of the sync pulse is transmitted at sync tip level (e.g., −40 IRE) for a time duration of $t_1$, a second portion is transmitted at peak white level (e.g., +100 IRE) for a duration of $t_2$ and a third portion is transmitted for a duration of $t_3$ at a sync tip level (e.g., −40 IRE).

It will further be apparent to one of ordinary skill in the art that the sync pulse may be split into more than three portions and more than two levels may be transmitted. The seemingly infinite number of combinations and permutations of portions and levels prevents all such combinations from being shown in the Figures.

It will now be explained why the +100 IRE level is chosen as a preferred level to transmit a portion of the sync pulse and why it is advantageous to transmit a split sync pulse with at least sync tip level (−40 IRE) and peak white level (+100 IRE) information.

Transmission of the +100 IRE level serves multiple purposes. First, it provides a second reference level (sync tip level being the first) in the transmitted signal, from which the descrambler may calculate the amplitude of the axis of inversion. Since the axis of inversion may be related to the peak white level and the sync tip level, if anything happens to change the amplitude of the demodulated signal, the descrambler may calculate a new axis of inversion without error based on the transmitted levels. Secondly, the +100 IRE reference provides for a reference at −40 IRE in the case of sync inversion. This may be seen by considering that when a split sync pulse in accordance with the present invention is inverted about a +30 IRE axis, the portion of the sync signal at +100 IRE now becomes −40 IRE. As pointed out above, this reference is needed for efficient and proper operation of the AGC circuits in the demodulator. As also described above, this reference is necessary for proper operation of the clamp, which is an essential part of the modulator.

Another advantage of providing a split sync pulse is that many television receivers are designed to require detection of the sync tip level for nearly the entire 4.7 microsecond sync pulse time in order to recognize the sync pulse. In these systems if the sync tip level is not detected for nearly 4.7 microseconds, the receiver disregards the pulse and considers it to be noise. This advantage relates to the operation of sync and AGC circuits in receivers attempting to take reception directly from broadcast signals as oppsed to from a cable system. Thus, many unauthorized receivers will not be able to synchronize based on the shortened sync tip level pulse transmitted in accordance with the present invention.

FIG. 2D illustrates an example of a waveform of a video signal containing a split sync pulse similar to that of FIG. 2A where the video signals is scrambled by inverting both the sync pulse and the active video signal. It will be recognized that the sync or video may also be inverted individually with the use of a split sync pulse according to the present invention. Note that the second portion of the sync pulse in FIG. 2D is now at the −40 IRE level, providing a reference for AGC circuits in television receivers and clamps in modulators. This figure illustrates yet another advantage of the split sync pulse. When the sync pulse is inverted (with or without video), the TV receiver may still find a signal at sync tip level, but the time of transition to the sync level will be delayed with respect to the true leading edge of sync. Since this leading edge establishes the horizontal position of the picture on the face of the picture tube, the picture may be made to shift horizontally on the screen as the scrambling mode changes from sync inverted to sync not inverted. The time shift is on the order of 2 microseconds out of a total horizontal line time of 63.5 microseconds, which represents a shift of about 3% of the picture width. This is adequate to produce an annoying jumping pattern, and can drastically reduce the sharpness of the picture if done at a properly chosen rate.

The use of a split sync pulse may further be used with various other scrambling techniques that are known in the art. For example, the split sync pulse technique of the present invention may be used with sync suppression, video inversion, video inversion and sync inversion, sync inversion, drop field and dynamic modes of scrambling. This list of scrambling modes is by way of example and is not exhaustive.

It is further within the scope of the invention that on some lines, a nonsplit sync pulse (standard sync pulse) may be transmitted while on other lines a split sync pulse is transmitted. Also, some lines may split the sync pulse in one way while other lines split the sync pulse in another way. For example, some lines may be transmitted with a sync pulse split into two portions (as shown in FIG. 2A or 2B) while other lines may be transmitted with a sync pulse split into a number other than two portions, for example, three potions (as shown in FIG. 2C). Moreover, not only may a different number of portions be transmitted on different lines, the level at which portions are transmitted on different lines may be varied on some lines. For example, with a two potion sync pulse, some lines may be transmitted as shown in FIG. 2A and other lines may transmit one of the portions at a level other than −40 IRE or +100 IRE. Also, some lines may transmit a split sync pulse by providing a first portion at −40 IRE and a second portion at +100 IRE and on another or other lines provide a first portion at +100 IRE and then a second portion at −40 IRE. Combinations of varying the number of portions and using different levels may also be employed.

BRIEF DESCRIPTION OF THE DRAWINGS

FIG. 1A illustrates a sketch of a video signal.

FIG. 1B, 1C and 1D illustrate sketches of various forms of scrambled video signals.

FIG. 3 is a circuit diagram of a scrambler capable of scrambling signals in accordance with the present invention.

FIGS. 4A, 4B and 4C are a timing diagram useful for understanding the operation of FIG. 3.

FIG. 11 is a block diagram of a CATV settop converter capable of reinverting video signals.

FIGS. 12A-12C are a schematic circuit diagram of a preferred embodiment of a descrambler capable of being used with the present invention.

DESCRIPTION OF THE PREFERRED EMBODIMENTS

Having described the format of the signal used in conjunction with the present invention and some advantages thereof, circuitry used for generating the split sync pulse and for descrambling the same will now be described.

Figure 2A:
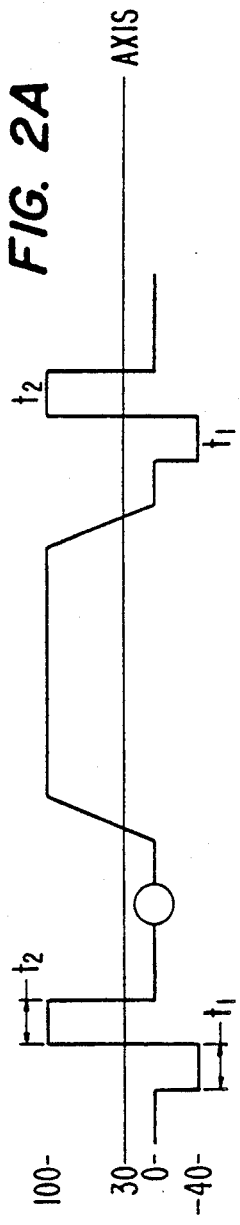
FIGS. 2A, 2B and 2C illustrate video signals having a split sync pulse in accordance with the teachings of the present invention.
Figure 2B:
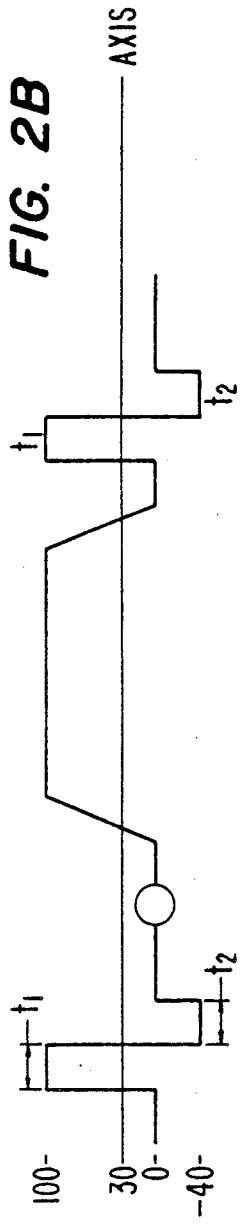
Figure 2C:
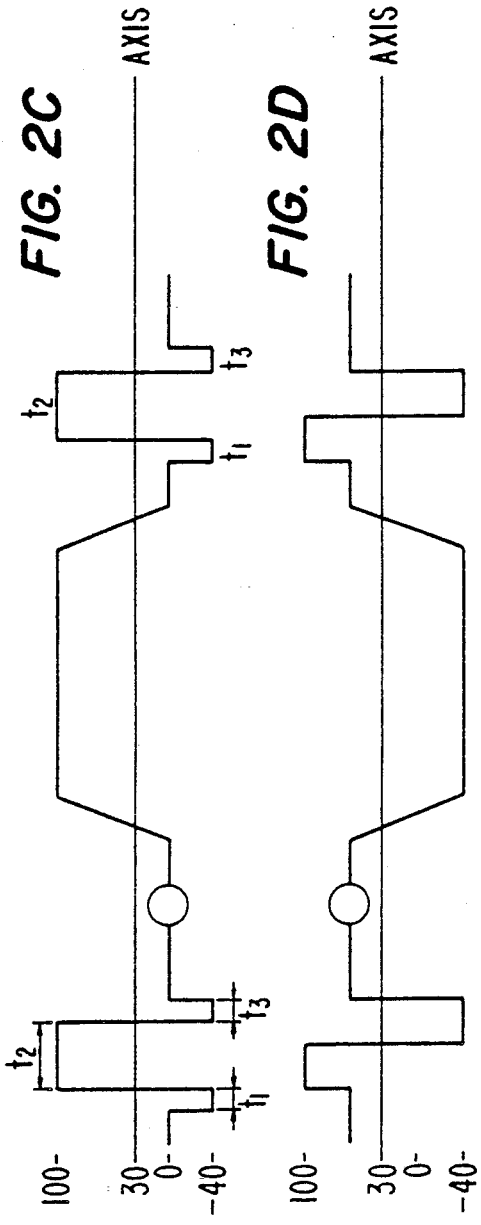
Figure 2D:
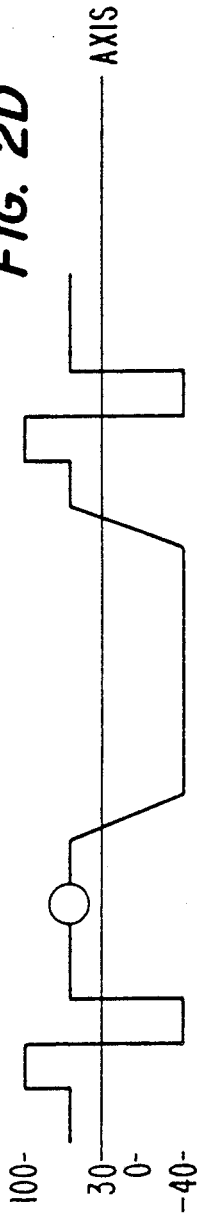
FIG. 2D illustrates a scrambled video signal having a split sync pulse.

For simplicity, the general circuitry necessary for implementing a preferred embodiment of this invention as shown in FIG. 2A will now be described. In this embodiment a first portion of the sync pulse is at a $-40$ IRE level and a second portion of the sync pulse is at the $+100$ IRE level. After the discussion of the circuitry necessary for carrying out this formal of sync pulse, it will be apparent to one or ordinary skill what changes will be necessary to implement the other emodiments and various other sync pulse formats as described above.

FIG. 3 illustrates the basic circuitry needed for scrambling a signal with a split sync pulse. Video signals are delivered to the scrambler from an appropriate source in a manner known in the art. An example of such a source may be an earth station receiver tuned to receive a particular channel transmitted via satellite transmission, for example, one of the pay movie services. (If the signal is scrambled by a different technique for transmission via satellite, it should be decoded back to normal NTSC format before being applied to this circuit.) A clamp, 201, may be sued to set the signal to a constant voltage level determined by either a sync tip level or a back porch level. Such circuits are well known to those skilled in the art.

Following the clamp, the video signal is supplied to switch S1 for a period of time. The incoming video signal is applied to switch S1 when S1 is in position A as shown in FIG. 2A. During the time that corresponds to the actual interval of the actual sync pulse of the video signal, switch S1 is switched to position B. This connects switch S1, through a sine-squared filter 202 to switch S2. S2 is normally in position D which may correspond to a position that connects S2 to a voltage representative of the blanking level, e.g., 0 IRE. For convenience this may be ground. At the appropriate time (which will be described later), switch S2 is switched to position E which corresponds to a position that connects S2 to a voltage representative of the sync tip level, e.g., $-40$ IRE. At another time (which will be described later), switch S2 is switched to position F which corresponds to a position that connect S2 to a voltage representative of the peak white level., e.g. $+100$ IRE. Switching switch S1 from position A to position B connects S1 to S2, to thereby replace the actual sync pulse of an incoming video signal with the split sync pulse according to the present invention.

For other embodiments, it can be seen that S2 may be switched in different orders and to other positions (not shown) which may connect S2 to other voltage levels as desired. The movement of these switches is controlled by switching control pulses generated by logic circuits that are synchronized to the incoming video signals. This feature will be explained in more detail below.

Operation of switches S1 and S2 is best understood with reference to the timing diagrams of FIGS. 4A, 4B and 4C. Shown in FIG. 4A is the horizontal blanking interval 105 of a video signal, which is similar to the video signal of FIG. 1A with like parts being depicted in a like manner. At some predetermined time $T_B$ during the front porch interval (104), switch S1 is thrown from position A to position B to replace the actual sync pulse of the incoming video signal with a split sync pulse generated in accordance with the teachings of the present invention. This is represented in FIG. 4B which is an illustration of the position of switch S1 with respect to time. When switch S1 is in position B it is connected to the output of switch S2. Switch S1 remains in position B for the duration of the horizontal blanking interval as indicated by FIG. 4B. Switch S2 is normally portioned at position D. At this position, S2 is connected to a voltage corresponding to the blanking level, which may correspond to 0 IRE. Since the incoming video signal is also at a level corresponding to the blanking level when S1 is thrown to position B, no change in the output voltage from S1 (point G of FIG. 3) will be observed at this time. At the time $t_o$ when the leading edge of the sync tip occurs, S2 is thrown to position E. At this position S2 is connected to a voltage corresponding to the sync tip level which may correspond to $-40$ IRE. This generates the $-40$ IRE level portion of the split sync pulse. At time $t_a$, S2 is thrown to position F. At this position, S2 is connected to a voltage corresponding to the peak white level which may correspond to $+100$ IRE. This forms the $+100$ IRE portion of the split sync pulse. At time $t_b$, corresponding to the trailing edge of the sync pulse, S2 is returned to the 0 IRE level. During the breezeway time, 102, S1 is returned to position A where it stays until the next front porch interval, 104.

FIG. 4B shows that up until the time $T_B$ (the beginning of the HBI) switch S1, is in position A. At time $T_B$, switch S1, is switched to position B. S1 remains in position B until the end of the HBI, time TA.

FIG. 4C shows that until time $t_o$ (the leading edge of the sync pulse of the incoming video signal) S2 is in position D (0 IRE). From time $t_o$ until $t_1$, S2 is in position E ($-40$ IRE). From time $t_1$ until $t_b$, S2 is in position F ($+100$ IRE).

In this example, time $t_1$ (FIG. 2A) corresponds to the time period $t_o$–$t_a$ and time $t_2$ (FIG. 2A) corresponds to the time period $t_a$–$t_b$.

While it is possible to carry out this embodiment of the invention with only one switch connected to $+100$ IRE at the appropriate times, and connected to the video the rest of the time, this is not preferred. Due to bandwidth limitations the transition times of the split sync pulse must be carefully controlled. Otherwise, when the signal is transmitted via an RF carrier, ringing will occur at each transition, and this will distort recovery of the levels required. This ringing is known as "Gibbs ringing," and is well known to those skilled in the art. Gibbs ringing may be controlled by using switches S1 and S2 of FIG. 3 and inserting therebetween a specially shaped filter, 202, (known as a sine squared filter by the television industry or as a raised cosine filter by the data communications industry). The standard reference describing these filters is Kastelein, Arden, "A New Sine-Squared Pulse and Bar Shaping Network," *IEEE Transactions on Broadcasting,* Vol. BC-16, No. 4, December, 1970, p. 84 ff.

Returning to FIG. 3, from contact G of S1, the signal is applied to a known inversion amplifier 203, which controls inversion of all or part of the signal according to the state of an INVERT signal applied to switch S3. This INVERT signal may be generated in a number of ways. For example, the signal may be based on a pseudo-random algorithm in a microprocessor synchronized to the video signal. Deviation of this signal will be further discussed below. When S3 is in the $+$ position, the output is taken from the collector of transistor Q2, which is part of inversion amplifier 203. By so doing, the signal is not inverted. If the INVERT signal state is such that inversion is called for, S3 is thrown to the $-$ position, whereby the signal is taken from the collector of transistor Q1 which is part of inversion amplifier 203. By so doing, the signal is inverted.

Figure 5A:
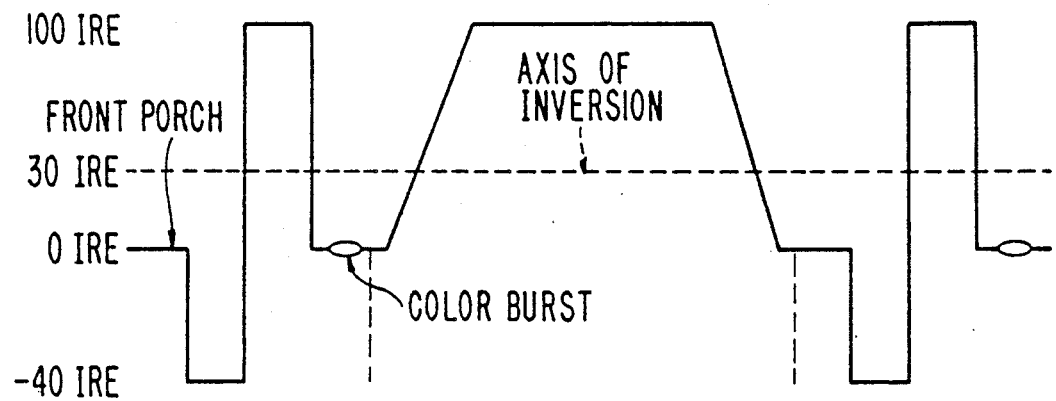
FIGS. 5A, 5B and 5C illustrate a timing diagram and video signals.
Figure 5B:
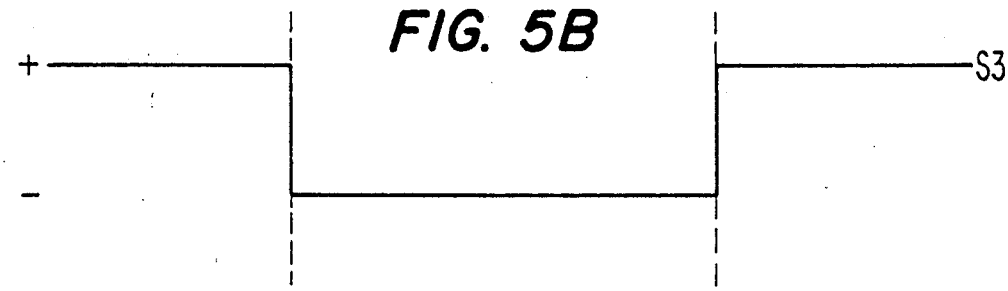
Figure 5C:
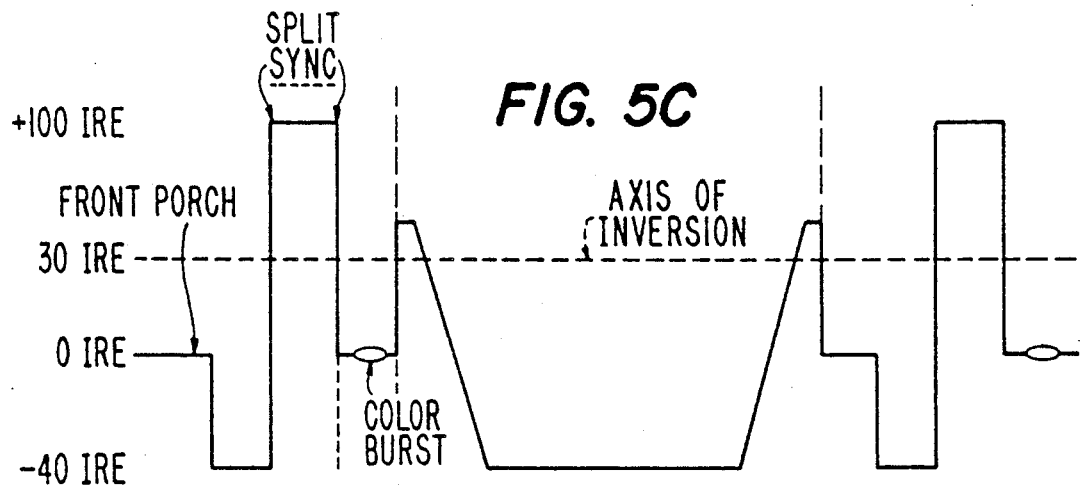

Operation of S3 is illustrated in the timing diagram of FIGS. 5A, 5B, and 5C, for the case of inversion of active video only. With an understanding of the timing of S3 for the case shown the operation of S3 for all other possible scrambling modes will be apparent to one of ordinary skill in the art.

FIG. 5A represents a video signal with a split sync pulse similar to FIG. 2A. FIG. 5B shows that during the video portion of the video signal, S3 is switched from $+$ to $-$ thereby inverting the video portion of the video signal as shown in FIG. 5C. During other portions of the video signal, S3 is connected to the $+$ position therefore no inversion of those portions of the signal occur.

Returning to FIG. 3, from S3 the signal is buffered in a non inverting amplifier 204 and then supplied to a modulator.

An AXIS signal is applied to the base of transistor $Q_2$ of inversion amplifier 203 to provide information to the inversion amp regarding the desired axis of inversion. Generally speaking, the axis of inversion is found by providing the peak white level voltage and the sync tip voltage, derived from the incoming video signal, to a voltage divider network illustrated generally as R1 and R2 in FIG. 3. The manner in which this signal is generated will be described in more detail below.

Figure 6:
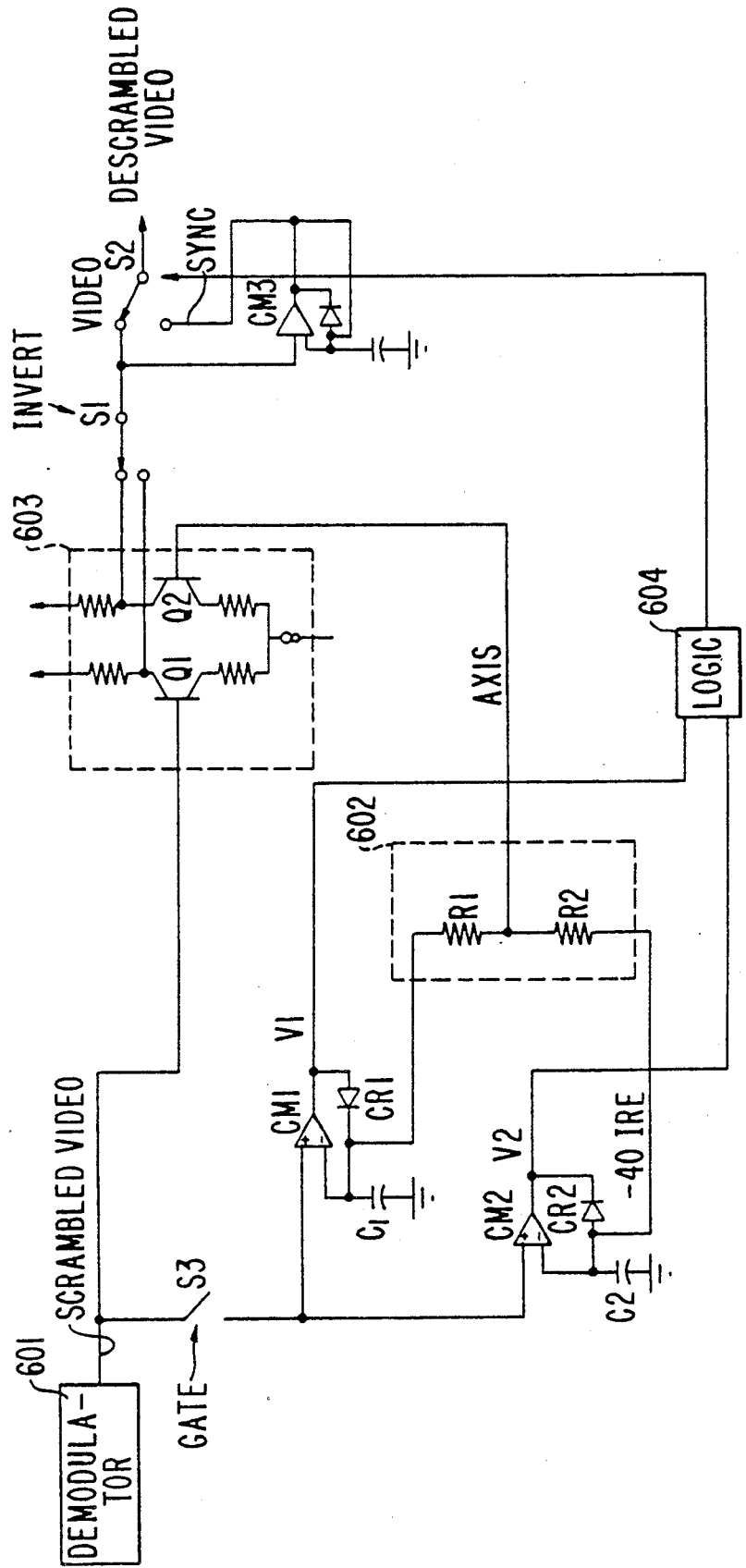
FIG. 6 is a circuit diagram of a descrambler capable of descrambling signals in accordance with the present invention.

FIG. 6 illustrates circuitry which may be used for descrambling the signal. A demodulator, 601, is part of the set-top terminal, and supplies a baseband scrambled signal which is essentially equal to the signal supplied to the modulator in FIG. 3, though the amplitude might be changed due to errors in the transmission system.

The video signal is supplied to two circuits in parallel. It is supplied to an inverting amplifier 603 which is substantially identical to the amplifier 203 (of FIG. 3) in the scrambler. The output from this amplifier is selected by switch S1 depending on the instantaneous state of the INVERT signal. The INVERT signal is reconstructed from information transmitted supplementally to the descrambler, for example, on the sound carrier. A method of accomplishing this is described below. Following the re-inversion as necessary, the video signal is supplied to switch S2, which restores the sync to its proper state. During the entire video signal except for the sync pulse time, S2 is connected to the video signal. During the sync pulse time, switch S2 is connected to the peak negative voltage (e.g., $-40$ IRE) of the incoming video signal.

Derivation of the incoming sync pulse time and inversion axis levels is handled in the second path followed by the incoming signal, through switch S3. This switch is controlled by a GATE signal derived from supplemental information as is the INVERT signal, supra. Switch S3 closes and connects the video signal to the two comparators CM1 and CM2 only during the horizontal blanking interval. Comparator CM1 detects the positive peak of the split sync. Its operation is explained below.

Figure 7:
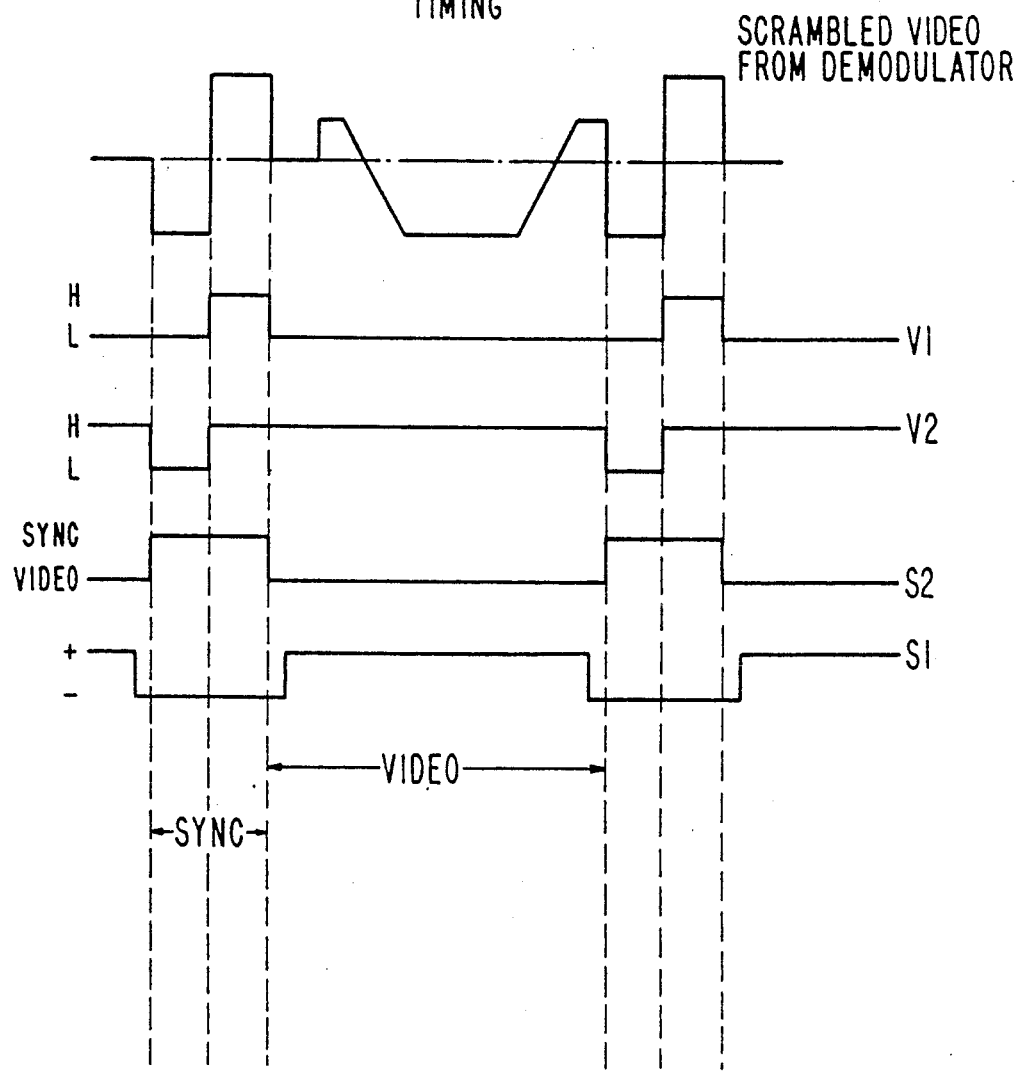
FIG. 7 is a timing diagram for the circuit of FIG. 6.

If the video voltage on the $+$ input of CM1 is less than the voltage stored on capacitor C1, the output of CM1, V1, is low. When the input voltage rises to the same as on C1, the output from CM1 will also rise, enough to keep the voltage on C1 equal to the input voltage. When the input again drops below the voltage on C1, V1 drops to its most negative state, reverse biasing CR1, which disconnects C1 from the output of CM1. This operation is shown in the timing diagram of FIG. 7 at the V1 line, which shows that V1 goes positive only during the $+100$ IRE state of the split sync pulse (recall that S3 is open during active video, preventing V1 from being high when a $+100$ IRE video signal is transmitted).

Comparator CM2 operates similarly to CM1 except that it is arranged to detect the negative portion of the split sync pulse. Thus, capacitors C1 and C2 store the $+100$ and $-40$ IRE voltages respectively. The axis of inversion is calculated from these two voltages by voltage divider network 602 comprising resistors R1 and R2. Since a typical operating point is for the axis of inversion to be precisely between $+100$ and $-40$ IRE, (at 30 IRE), R1 and R2 may typically have the same value though other values are possible. While $+30$ IRE is considered to be the preferred axis of inversion, other axes are possible and might be favored under some conditions. The node voltage between R1 and R2 represents the axis of inversion, and is applied to an input of a transistor Q2 of the inverting amplifier 603.

Figure 8:
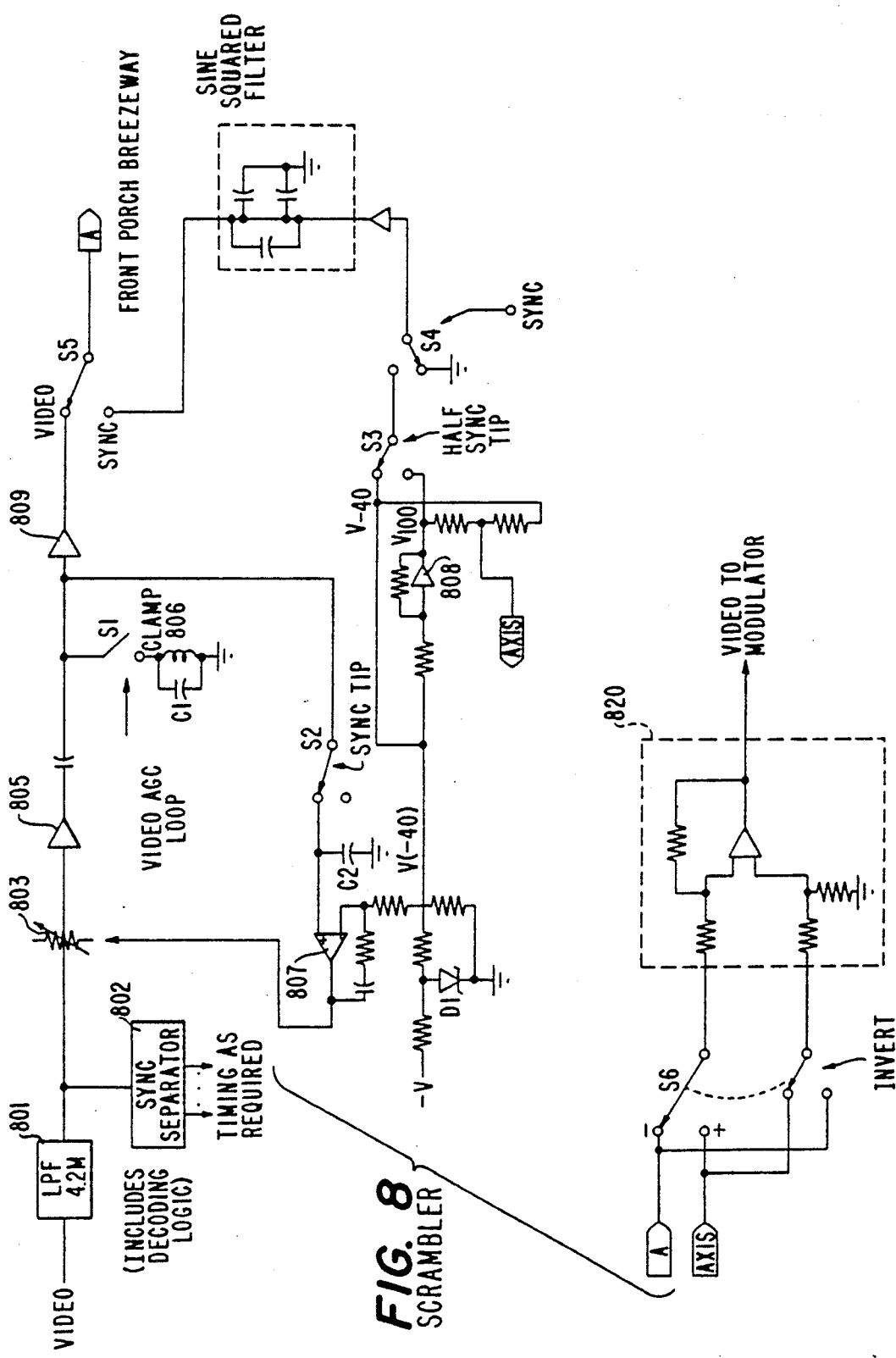
FIG. 8 is a circuit diagram of a preferred embodiment of a scrambler capable of scrambling signals in accordance with the present invention.

FIG. 8 shows a preferred embodiment of the scrambler. Baseband video is supplied, for example, from an earth station receiver. A phase equalized low pass filter, 801 is used to provide a reduction of energy in the video signal around 4.5 MHz, where it could later interfere with recovery of timing information. The low pass filter is of a type known in the art. From the low pass filter, the signal is supplied to a sync separator 802, also known in the art, which supplies a number of signals to synchronize operation of the scrambler. The sync separator and decoding logic, 402 are made of an oscillator and a divider, the output of which is phase locked to the horizontal sync of the incoming video. By decoding various counts of the divider chain (in a known manner), the necessary timing signals required for controlling the various circuit elements are derived. These timing signals include, but are not limited to, signals defining the beginning and end of the horizontal blanking interval, the beginning, middle and end of the horizontal sync tip, and timing pulses to be applied to the sound carrier to synchronize the descrambler.

The video is also supplied to a video AGC loop, one purpose of which is to normalize the video level based on the amplitude of the sync tip. Such AGC circuits are known to those skilled in the art. This is not a part of the scrambling process per se, but is a useful adjunct to it in that the level of the video signal would otherwise have to be manually matched to the level assumed by the scrambling process. The gain of the signal is adjusted automatically such that the sync tip is held at a constant level at the output. An AGC circuit at this place in the transmission chain should not try to correct the signal level of active video, because to do so would cause dark scenes to be lightened, for example. Operation of the AGC circuit will now be explained.

The video is supplied to a variable attenuator 803 which can be controlled by a voltage source. This attenuator is used to control the amplitude of the video through a process which will be explained. From the attenuator, the video is buffered in amplifier 805 and capacitively coupled to a clamp circuit 806. The clamp preferably forces the back porch time of the video signal to be at zero volts. During the back porch, a timing signal from the sync separator and decoding logic, 802, causes switch S1 to close. This connects the video signal to ground through a parallel tank circuit C1-L1. This circuit is resonant at 3.58 MHz, and is used to prevent the color burst from being shorted to ground. The video is supplied to a sample and hold circuit, S2 and C2. A signal from the decoding logic 802 causes S2 to close during sync tips. The sync tip level is thus held on capacitor C2. It is compared in amplifier 407, against a reference dc level on the inverting input. This reference level is derived from Zener Diode D1. The output of amplifier 807 controls the gain of attenuator 803 such that the sync tip level held on capacitor C2 always equals the reference on the inverting input, regardless of the level of the incoming video.

The voltage established by the Zener Diode as the sync tip level, $V_{-40}$, is supplied to switch S3, and will be a part of the signals used to create the split sync. (Operation of the switches is best understood by referring to the timing diagram of FIG. 9. It is to be noted that corresponding switches in FIGS. 3, 6 and 9 may not be labeled identically.). This voltage ($V_{-40}$) is also amplified in inverting amplifier 808, which preferably has a gain of $-2.5$, so that its output is $+100$ IRE ($V_{100}$). The output of S3 is supplied to S4, which selects either the $-40$ or 100 IRE levels from S3, or the blanking level (0 volts), under control of a timing signal from the decoding logic in 802. Output from S4 is the split sync pulse (minus the video), which is supplied to the output via S5 during the time from the front porch to the breezeway, as shown in the timing diagram of FIG. 9. Before being supplied to switch S5, the split sync pulse from S4 is filtered in a sine squared filter.

Figure 9:
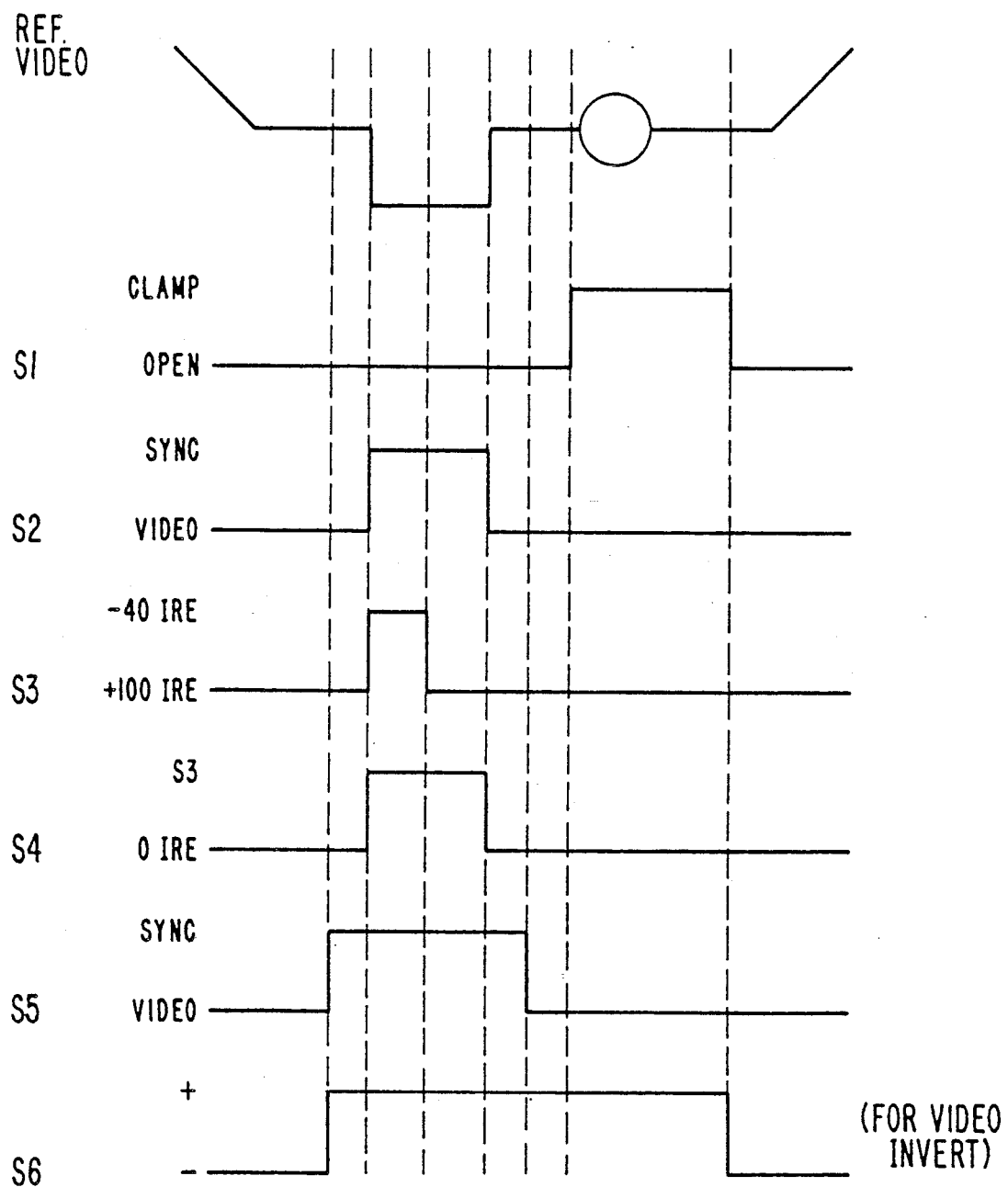
FIG. 9 is a timing diagram for the circuit of FIG. 8.

Switch S5 is connected to the video from buffer amplifier 809, except that from part way through the front porch until the breezeway, it is connected to the split sync pulse generated as described above. This can further be seen from the timing diagram of FIG. 9. Thus, the output at flag A is the AGC'd video signal with the incoming sync replaced with the split sync pulse in accordance with the present invention. This video is supplied in this embodiment to ganged switches S6, which route the video to either the inverting or non inverting input of a video operation amplifier 820, according to the state of an INVERT signal supplied from the sync separator and decoding logic, 802. The timing diagram of FIG. 9 shows a case where the horizontal blanking interval is inverted.

Figure 10:
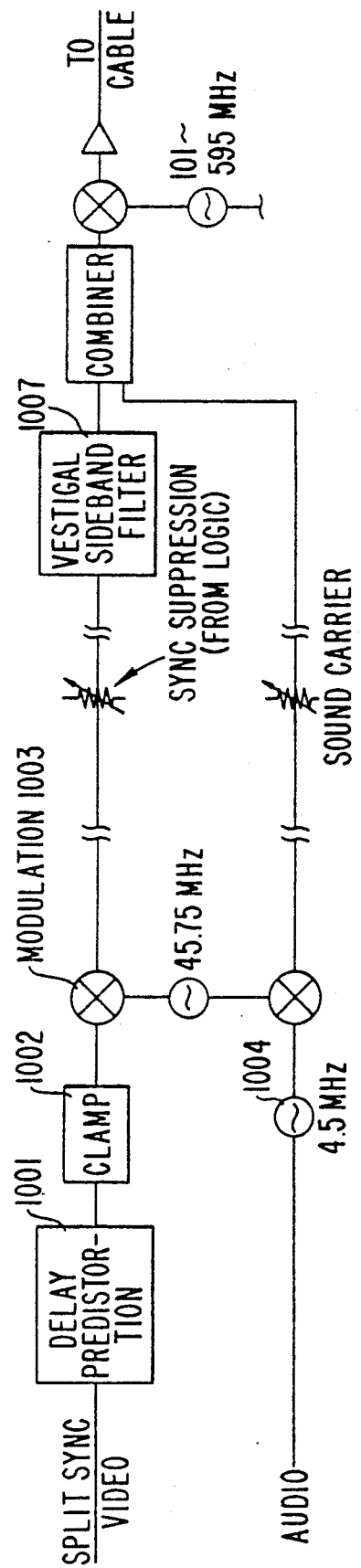
FIG. 10 is a circuit diagram of a modulator capable of use with the present invention.

Shown in FIG. 10 is a method by which the timing information is placed on the sound carrier. Split sync video information from the video op amp 820 is supplied to the video input of the modulator, and is received by delay predistortion filter 1001 which is a standard part of a TV modulator, and is used to compensate for the delay in an average television receiver. Next, a lamp 1002 is used to cause the output power from the modulator to be constant when sync tips are being transmitted. This is the clamp which we wished to ensure of proper operation by using the split sync signal. This signal is next applied to the video modulator 1003, the output of which is an intermediate frequency signal which is routed optionally (but preferably) to the scrambler where sync suppression is added according to prior technology. The signal is then routed back to the modulator where it is further filtered and up converted to the output channel after being combined with the audio carrier. Vestigial filter 1007 may also be provided, the structure and operation which is well known in the art.

The audio carrier is generated in an FM modulator 1004, which operates at 4.5 MHz in accordance with known technology. This signal is up converted to the sound IF (normally 41.25 MHz) and is routed to the scrambler, where timing pulses are amplitude modulated thereon in a known manner. The timing information placed on the sound carrier may be extended to control insertion of the timing signals needed to re-invert the video. To do so, additional information is sent interleaved with the timing pulses, as to the scrambling mode (sync suppression, active video invert, sync invert or other). The method of transmitting the mode information is as taught by Mobley, U.S. Pat. No. 4,471,380. After the mode is transmitted, circuits in the descrambler interpret the timing information to apply either to video inversion or to sync suppression, until updated mode information is sent from the scrambler. One of the modes possible is to invert video and suppress sync simultaneously, though the invention is not restricted to this.

FIG. 11 shows a set-top converter built to operate in accordance with the teachings of this invention. A set-top of this type is generically known as a baseband set-top converter because it includes a demodulator 1104 for bringing the video to baseband and a demodulator 1109 for brining the audio to baseband, operating on the respective signals, then remodulating them onto a new picture carrier in modulator 1110.

In operation, the RF signal from the cable enters the up/down converter 1101, which is a tuner for converting the selected one of the plurality of TV signals on the cable to an intermediate frequency, commonly 45.75 MHz for the picture carrier in 1102, and is then divided into two paths: one for recover of the picture information and the other for recovery of the sound information.

The picture path is supplied first to a switched gain attenuator 1103 whose purpose is to recover suppressed sync if such is being transmitted. This attenuator is controlled by signals from timing recovery circuit 1108. The IF signal is supplied form the attenuator to the demodulator 1104, which is known in the art. Output from the demodulator is supplied to the video reinversion circuit 1105, described above and in more detail below. Operation of this circuit is also controlled by timing recovery circuits 1108. After re-inversion, the video signal is supplied to modulator 510 for transmission to the TV set.

The sound path consists first of an intercarrier detector 1106 to recover the sound carrier at the 4.5 MHz spacing between the picture and sound carriers, in accordance with the teachings of Mobley, U.S. Pat. No. 4,567,517. Output from the intercarrier detector is supplied first to an amplitude modulation detector 1107, which supplies timing signals to the timing circuit. The intercarrier signal may also be applied to an FM demodulator 1109 for recovery of sound information. This sound signal may then be adjusted in level by volume control 1111 (usually controlled by a microprocessor), before being sent to the modulator 1110.

Optionally, the video and audio just before the modulator may be supplied to baseband connectors for connection directly to monitors and hi-fi systems without the need to remodulate to RF.

Figure 12A:
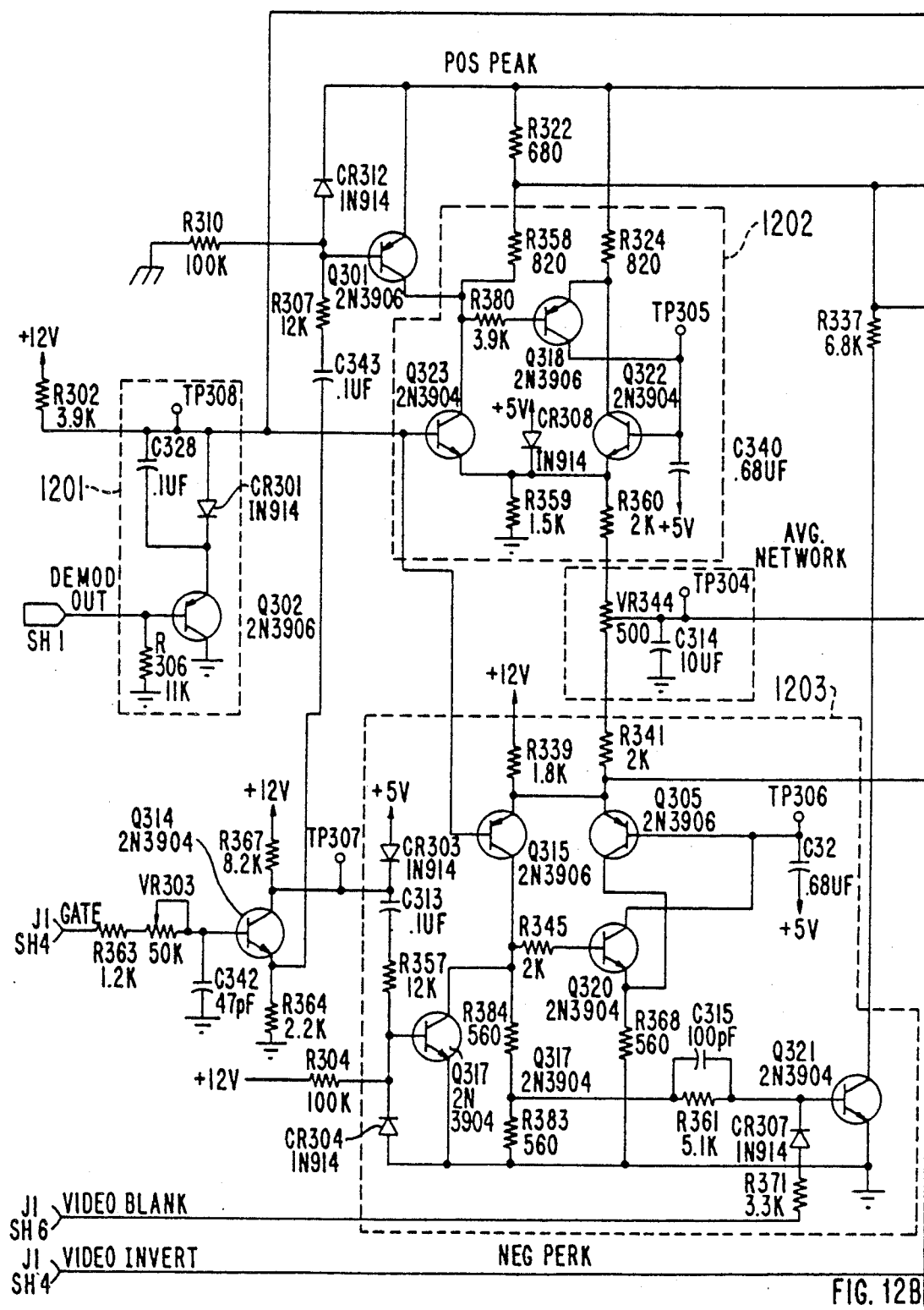
Figure 12C:
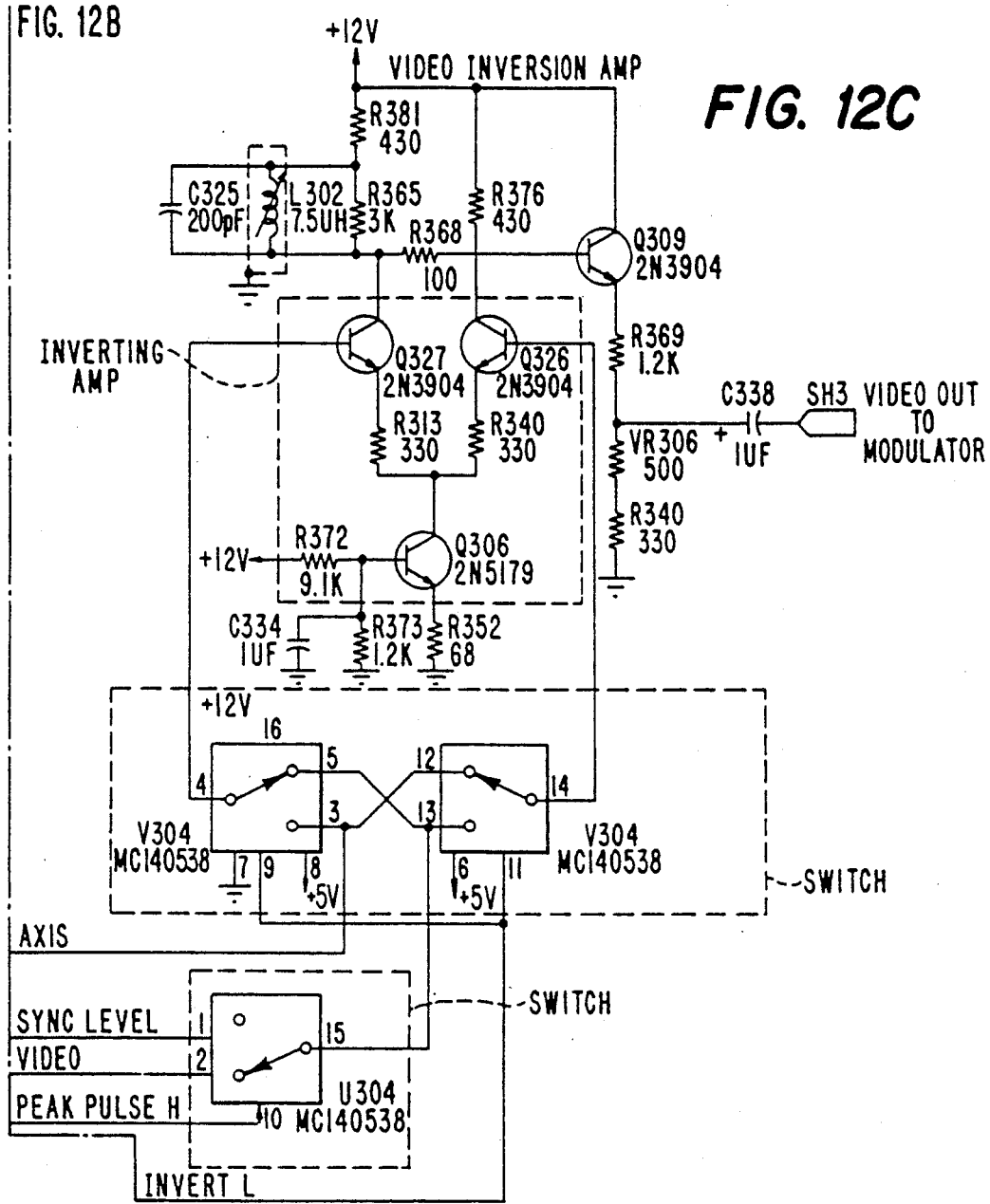

FIG. 12 shows a preferred embodiment of the descrambler. Baseband video from the demodulator is supplied to a level shifter 1201 which serves to translate the d.c. potential that the video rides on as a result of operation of the demodulator, to a range more conducive to operation of the following circuits in a manner known in the art. The signal is next supplied to + and − peak detectors (CM1 and CM2 of FIG. 6). The + peak detector is indicated as 1202 and the −peak detector is indicated as 1203. Operation of the two is nearly identical, and only operation of the + detector will be explained in detail.

The peak voltage is held on capacitor C340, and supplies one input of a comparator consisting of Q322 and Q323. Normally the video signal on the base of Q323 is at a lower potential than is the voltage on the base of Q322. Under this condition Q323 is off and Q322 is in its active region. When the voltage on the base of Q323 tries to rise above that on the base of Q322, Q323 begins to turn on, causing the voltage on its collector to drop. At the same time, the collector current in Q322 drops (since the sum of the two collector currents must be conducted primarily through R359, and so must be constant). This causes the voltage on the collector of Q322 to rise. As the voltage on the collector of Q323 falls and the voltage on the collector of Q322 rises, Q318 begins to turn on. This charges C340, until an equilibrium condition is reached at which the voltage on the base of Q322 is equal to the most positive voltage on the base of Q323.

When Q323 begins to turn on, allowing it's collector voltage to drop, Q324 also turns on, saturating since no resistance is present in it's base. This generates a positive going pulse on it's collector, which represents, at this time, the existence of a positive peak pulse detected by the + peak detector. This path will be explained below.

In order to inhibit the detection of a peak in the video, which might be equal in amplitude to the + portion of the sync pulse, a GATE pulse is used. It is applied from the timing circuits (not shown), through a delay (VR303 and C342), to transistor Q314. This signal disables the + and − peak detectors except during the horizontal blanking interval. Transistor Q301 (top left of schematic) is normally turned on by base current in a 100K resistor R310 connected to ground from its base. When Q301 is on, it shorts the collector of Q323 to +12 volts, holding Q318 and Q324 off. When the GATE pulse (+going) is present, Q301 is turned off through C343 and R307, allowing the other transistors to operate as described above.

The operation of the − peak detector is similar to that of the + peak detector, with the addition of Q321, which inverts the − peak signal before supplying it to Q324. Thus, Q321 and Q324 form the logic function 604 shown in FIG. 6. The signal on the collector of Q324 is the signal which identifies the time of the sync pulse which needs to be restored, which operates switch S2 in FIG. 6. One more practical addition may be added to his circuit. The split sync pulse cannot transition instantaneously from −40 to +100 IRE as explained above. The transition time required is on the order of 250–300 nano-seconds. At the point where we stopped describing the above circuit, the collector of Q324 would return to ground, indicating no sync, during this transition time, causing incorrect operation of the sync restoration circuit which follows. In order to prevent this, a transistor Q350 may be added on the collector of Q324 along with Q324, form a one shot having a time duration, set by the components in its base, of approximately ⅔ of the sync tip length (4.7 microseconds). As soon as the collector of Q324 goes positive, indicating the arrival of a sync tip, the added transistor Q350 turns on, pulling the base of Q324 low, reinforcing the latter's ON state. After a time of approximately 3 microseconds, the 150 pF capacitor charges, turning off the added transistor Q350. By this time, the second half of the split sync pulse has arrived, holding Q324 on until it ends. Thus, the collector of Q324 is positive during the duration of both halves of the split sync pulse.

The axis voltage, derived at the junction of R1 and R2 in FIG. 6, is derived on the wiper of potentiometer VR304 (left of center in the drawing) in FIG. 12. The +peak and −peak voltages, stored respectively on C340 and C324, are taken from the emitters of transistors Q322 and Q305 respectively, in order to provide impedance buffering. The voltages could be taken directly from the two capacitors, as shown generally in FIG. 6, however, the value of capacitor used would have to be much greater due to the need to maintain a constant voltage on the two capacitors during a vertical blanking interval. Therefore, the chosen points in FIG. 12 are preferred.

FIG. 3 shows inversion effected by switching from one collector to the other in the inversion amplifier 603. The technique used in FIG. 12 is similar to that shown in FIG. 11 for inversion at the scrambler. The signal is taken from only one of the transistor collectors, Q327 (top right corner), and inversion is achieved by interchanging the two inputs between the active video and the axis voltage. The switching is done in the two sections of U304 directly below the differential amplifier.

Sync restoration is accomplished differently in FIG. 12, in that a separate sync sample and hold (CM3 in FIG. 6) is not used to hold the inverted sync peak level. Rather, the sync level from the −peak detector (already described) is buffered in Q325 (center of drawing), which compensates for the base-emitter voltage of Q305. The sync level is substituted for the incoming video by the lower section of U304, which is controlled by the SNYC signal on the collector of Q324, supra. Through CR315 (bottom right), the two switch sections which control inversion are forced to the non inverted state during sync pulses.

The VIDEO INVERT signal which enters from the lower left of the drawing corresponds to the INVERT signal of FIG. 6. It is delayed in VR301 and C337, as well as encountering some delay in the logic (not shown). The reason for the delay is that the video encounters some delay in the demodulator 1104. This delay is caused by the SAW filter which is part of the demodulator. Transistor Q326 converts the 0 to 5 volt logic level from the timing logic, to the +5 to +12 levels required for operation of the switches.

We claim:

1. In a scrambled video signal transmission system, wherein said scrambled video signal comprises at least a video component, a front porch, a back porch and a sync pulse component, a method of transmitting said sync pulse component comprising the steps of:
    transmitting said sync pulse component between the front porch and the back porch;
    said sync pulse component comprising a first sync pulse portion at a first predetermined substantially constant voltage level, and
    a second sync pulse portion at a second predetermined substantially constant voltage level different than said first predetermined substantially constant voltage level; and
    said scrambled video signal having a parameter related to at least one of said first and second voltage levels.

2. The method of claim 1 wherein said video signal comprises a peak white level indicative of a maximum video signal value and a sync tip level indicative of a minimum video signal value, wherein said first predetermined voltage level is substantially equal to one of said peak white level and said sync tip level and said second predetermined voltage level is substantially equal to the other of said peak white level and said sync tip level.

3. The method according to claim 2 said video signal comprises a plurality of lines and in at least one of said plurality of lines said sync pulse is transmitted with said first and second sync pulse portions having said first and second predetermined substantially constant voltage levels, respectively, and in at least another of said plurality of lines said sync pulse is transmitted with a single predetermined substantially constant voltage level.

4. The method of claim 1 further comprising the step of transmitting at least a third sync pulse portion at a third predetermined voltage level.

5. The method of claim 1 wherein said first sync pulse portion is transmitted for a first predetermined time interval and said second sync pulse portion is transmitted for a second predetermined time interval, where the sum of said first and second time intervals is less than or equal to 4.7 microseconds.

6. The method according to claim 1 wherein said video signal comprises a plurality of lines and in at least one of said plurality of lines said sync pulse is transmitted with said first and second sync pulse portions having said first and second predetermined substantially constant voltage levels, respectively, and in at least another of said plurality of lines said sync pulse is transmitted with a single predetermined substantially constant voltage level.

7. The method according to claim 1 wherein one of said first and second voltage levels corresponds to a sync tip level indicative of a minimum video signal value.

8. The method according to claim 1 wherein one of said first and second voltage levels corresponds to a peak white level indicative of a maximum video signal value.

9. The method according to claim 1 wherein one of said first and second voltage levels corresponds to a sync tip level indicative of a minimum video signal value and the other of sad first and second voltage levels corresponds to another component of the video signal.

10. The method according to claim 1 wherein said video signal comprises a scrambled video signal, said first and second voltage levels being used to descramble said scrambled video signal.

11. The method according to claim 1 wherein said first voltage level corresponds to a level of a first component of the video signal and said second voltage level corresponds to a level of a second component of the video signal.

12. In a video signal transmission system comprising a video signal transmitter and a video signal receiver, wherein said video signal comprises at least a sync pulse component a front porch pulse level, a back porch pulse level, and a video component, an apparatus for splitting said sync pulse component into plural portions comprising a first predetermined substantially constant voltage level for a first predetermined period of time and a second predetermined substantially constant voltage level for a second predetermined period of time, said first and second voltage levels occurring between the front porch pulse level and the back porch pulse level, said apparatus comprising:
    first switch means for selectively switching between a first switch position and a second switch position;
    second switch means for selectively switching between at least a third switch position and a fourth switch position;
    wherein said first switch position corresponds to a position which enables said first switch means to receive said video signal, said second switch position switch position corresponds to a position that enables said first switch means to be connected to an output of said second switch means,
    said third switch position corresponds to a position which enables said second switch to be connected to one of said predetermined voltage levels, said fourth switch position corresponds to a position which enables said second switch to be connected to one of said predetermined voltage levels; and
    further wherein said first switch means is in said first switch position during substantially the entire video signal except during the sync pulse component and said first switch means is in said second switch position during substantially the sync pulse component of said video signal.

13. The apparatus of claim 12 wherein said second switch means is further selectively switchable to a fifth switch position; and said third switch position corresponds to a position which enables said second switch means to be connected to a sync tip voltage level of said video signal;

said further switch position corresponds to a position which enables said second switch means to be connected to a peak white voltage level of said video signal; and said fifth switch position corresponds to a position which enables said second switch means to be connected to a blanking voltage level of said video signal.

14. In a scrambled video signal transmission system, wherein said scrambled video signal comprises at least a video component, a front porch, a back porch and a sync pulse component, apparatus for transmitting said video signal comprising:

transmitting means for transmitting said sync pulse component between the front porch and the back porch, said transmitting means including means for transmitting a first sync pulse portion at a first predetermined substantially constant voltage level and means for transmitting a second sync pulse portion at a second predetermined substantially constant voltage level different than said first predetermined substantially constant voltage level; and said scrambled video signal having a parameter related to at least one of said first and second voltage levels.

15. The apparatus according to claim 14 wherein said video signal comprises a peak white level indicative of a maximum video signal value and a sync tip level indicative of a minimum video signal value, wherein said first predetermined voltage level is substantially equal to one of said peak white level and said sync tip level and said second predetermined voltage level is substantially equal to the other of said peak white level and said sync tip level.

16. The apparatus according to claim 14 wherein said transmitting means further includes means for transmitting a third sync pulse portion at a third predetermined substantially constant voltage level.

17. The apparatus according to claim 14 wherein said first sync pulse portion is transmitted for a first predetermined time interval and said second sync pulse portion is transmitted for a second predetermined time interval, where the sum of the first and second predetermined time intervals is less than or equal to 4.7 microseconds.

18. A transmitter for transmitting a scrambled video signal comprising:

means for selectively scrambling at least a portion of the video signal;

said transmitter further comprising means for generating and transmitting said scrambled video signal with a sync pulse component wherein said sync pulse component having at least a first portion at a first substantially constant voltage level and a second portion at a second substantially constant voltage level different than the first voltage level; and wherein a scrambling parameter of said video signal is based on one or more of said voltage levels.

19. A receiver for receiving a scrambled video signal comprising:

means for selectively descrambling at least a portion of the video signal;

said receiver further comprising means for receiving the video signal with a sync component wherein said sync component includes at least a first portion having a first substantially constant voltage level and a second portion having a second substantially constant voltage level different than the first voltage level; and wherein a descrambling parameter of said video signal is based on one or more of said voltage levels.

20. In a video signal transmission system, wherein said video signal comprises at least a video component, a front porch, a back porch and a sync pulse component, a method of transmitting said sync pulse component comprising the steps of:

transmitting said sync pulse component between the front porch and the back porch, said sync pulse component comprising a first sync portion at a first predetermined substantially constant voltage level and a second sync pulse portion at a second predetermined substantially constant voltage level different than the first predetermined substantially constant voltage level wherein said first sync pulse portion is transmitted for a first predetermined time interval and said second sync pulse portion is transmitted for a second predetermined time interval, where the sum of the first and second predetermined time intervals is less than or equal to 4.7 microseconds.

21. The method according to claim 20 wherein said video signal comprises a plurality of lines and in at least one of said plurality of lines said sync pulse is transmitted with said first and second sync pulse portions having said first and second predetermined substantially constant voltage levels, respectively, and in at least another of said plurality of lines said sync pulse is transmitted with a single predetermined substantially constant voltage level.

22. The method according to claim 20 wherein one of said first and second voltage levels corresponds to a sync tip level indicative of a minimum video signal value.

23. The method according to claim 20 wherein said video signal comprises a peak white level indicative of a maximum video signal value and a sync tip level indicative of a minimum video signal value, wherein said first predetermined voltage level is substantially equal to one of said peak white level and said sync tip level and said second predetermined voltage level is substantially equal to the other of said peak white level and said sync tip level.

24. The method according to claim 23 said video signal comprises a plurality of lines and in at least one of said plurality of lines said sync pulse is transmitted with said first and second sync pulse portions having said first and second predetermined substantially constant voltage levels, respectively, and in at least another of said plurality of lines said sync pulse is transmitted with a single predetermined substantially constant voltage level.

25. The method according to claim 20 wherein one of said first and second voltage levels corresponds to a peak white level indicative of a maximum video signal value.

26. The method according to claim 20 wherein one of said first and second voltage levels corresponds to a sync tip level indicative of a minimum video signal value and the other of said first and second voltage levels corresponds to another component of the video signal.

27. The method according to claim 20 wherein said video signal comprises a scrambled video signal, said first and second voltage levels being used to descramble said scrambled video signal.

28. The method according to claim 20 wherein said video signal comprises a scrambled video signal, at least one of said first and second voltage levels being used to descramble said scrambled video signal.

29. The method according to claim 20 wherein said first voltage level corresponds to a level of a first component of the video signal and said second voltage level corresponds to a level of a second component of the video signal.

30. In a video signal transmission system, wherein said video signal comprises at least a video component, a front porch, a back porch and a sync pulse component, a method of transmitting said sync pulse component comprising the steps of:

transmitting said sync pulse component between the front porch and the back porch, said sync pulse component comprising a first sync pulse portion at a first predetermined substantially constant voltage level and a second sync pulse portion at a second predetermined substantially constant voltage level different than said first predetermined substantially constant voltage level, wherein said video signal comprises a peak white level indicative of a maximum video signal value and a sync tip level indicative of a minimum video signal value, wherein said first predetermined voltage level is substantially equal to one of said peak white level and said sync tip level and said second predetermined voltage level is substantially equal to the other of said peak white level and said sync tip level.

* * * * *